US011511519B2

(12) United States Patent
Curran et al.

(10) Patent No.: US 11,511,519 B2
(45) Date of Patent: Nov. 29, 2022

(54) TITANIUM PART HAVING AN ETCHED SURFACE

(71) Applicant: Apple Inc., Cupertino, CA (US)

(72) Inventors: James A. Curran, Sunnyvale, CA (US); Todd S. Mintz, San Jose, CA (US); Isabel Yang, San Jose, CA (US)

(73) Assignee: APPLE INC., Cupertino, CA (US)

( * ) Notice: Subject to any disclaimer, the term of this patent is extended or adjusted under 35 U.S.C. 154(b) by 211 days.

(21) Appl. No.: 16/867,200

(22) Filed: May 5, 2020

(65) Prior Publication Data

US 2021/0010151 A1    Jan. 14, 2021

Related U.S. Application Data

(60) Provisional application No. 62/871,594, filed on Jul. 8, 2019.

(51) Int. Cl.
*B32B 15/08* (2006.01)
*B32B 3/30* (2006.01)
*C22C 14/00* (2006.01)

(52) U.S. Cl.
CPC ............... *B32B 15/08* (2013.01); *B32B 3/30* (2013.01); *C22C 14/00* (2013.01)

(58) Field of Classification Search
CPC .................................. B32B 15/08; B32B 3/30
USPC ....................................................... 428/457
See application file for complete search history.

(56) References Cited

U.S. PATENT DOCUMENTS

| 9,746,765 | B2 | 8/2017 | Choi et al. | |
|---|---|---|---|---|
| 2010/0272963 | A1* | 10/2010 | Li | B44C 1/105 |
| | | | | 216/48 |
| 2011/0041553 | A1 | 2/2011 | Xiong et al. | |
| 2011/0050055 | A1 | 3/2011 | Lin et al. | |
| 2012/0135222 | A1 | 5/2012 | Chang et al. | |
| 2012/0229961 | A1 | 9/2012 | Zhu et al. | |
| 2013/0101765 | A1 | 4/2013 | Guan et al. | |
| 2013/0108813 | A1 | 5/2013 | Zhu | |
| 2014/0284071 | A1 | 9/2014 | Tao | |
| 2017/0282424 | A1 | 10/2017 | Zhang et al. | |
| 2019/0069076 | A1 | 2/2019 | Tsang et al. | |
| 2019/0098785 | A1 | 3/2019 | Mintz et al. | |
| 2021/0010151 | A1* | 1/2021 | Curran | B32B 3/30 |

FOREIGN PATENT DOCUMENTS

| CN | 101992651 A | 3/2011 |
|---|---|---|
| CN | 102006753 A | 4/2011 |
| CN | 102480879 A | 5/2012 |
| CN | 102480880 A | 5/2012 |
| CN | 102686075 A | 9/2012 |
| CN | 103068198 A | 4/2013 |
| CN | 103096650 A | 5/2013 |

(Continued)

*Primary Examiner* — Betelhem Shewareged
(74) *Attorney, Agent, or Firm* — Dorsey & Whitney LLP

(57) ABSTRACT

This application relates to a part for a portable electronic device. The part includes a titanium alloy substrate including a network of branching channels. The branching channels include a first channel and a second channel, where the first channel is defined by a first channel wall that extends away from a first opening in the exterior surface, and the second channel is defined by a second channel wall that extends away from a second opening in the first channel wall.

20 Claims, 11 Drawing Sheets

(56) References Cited

FOREIGN PATENT DOCUMENTS

| | | | |
|---|---|---|---|
| CN | 104066283 | A | 9/2014 |
| CN | 105522682 | A | 4/2016 |
| CN | 105522683 | A | 4/2016 |
| CN | 105522684 | A | 4/2016 |
| CN | 109023497 | A | 12/2018 |
| CN | 109475056 | A | 3/2019 |

* cited by examiner

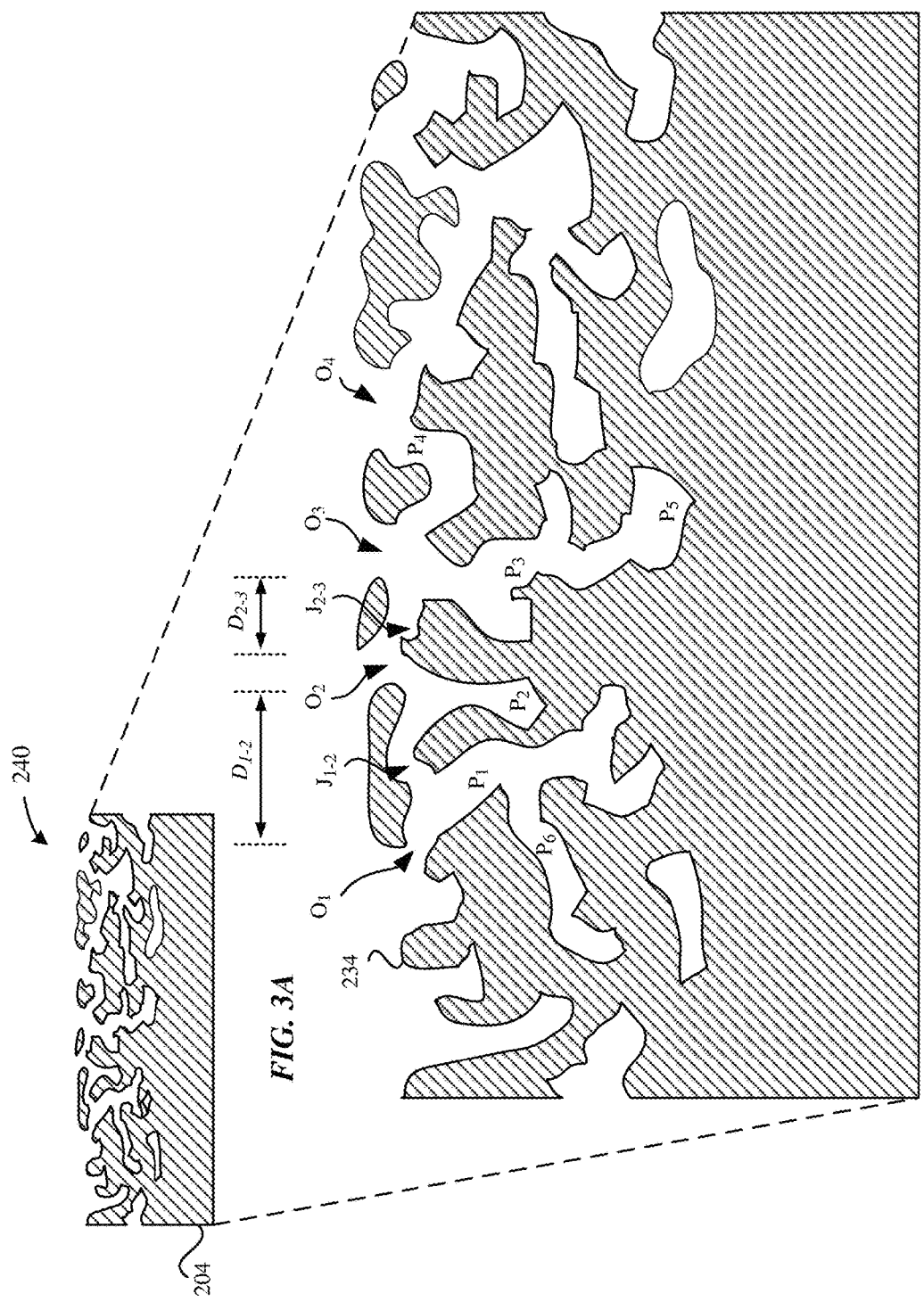

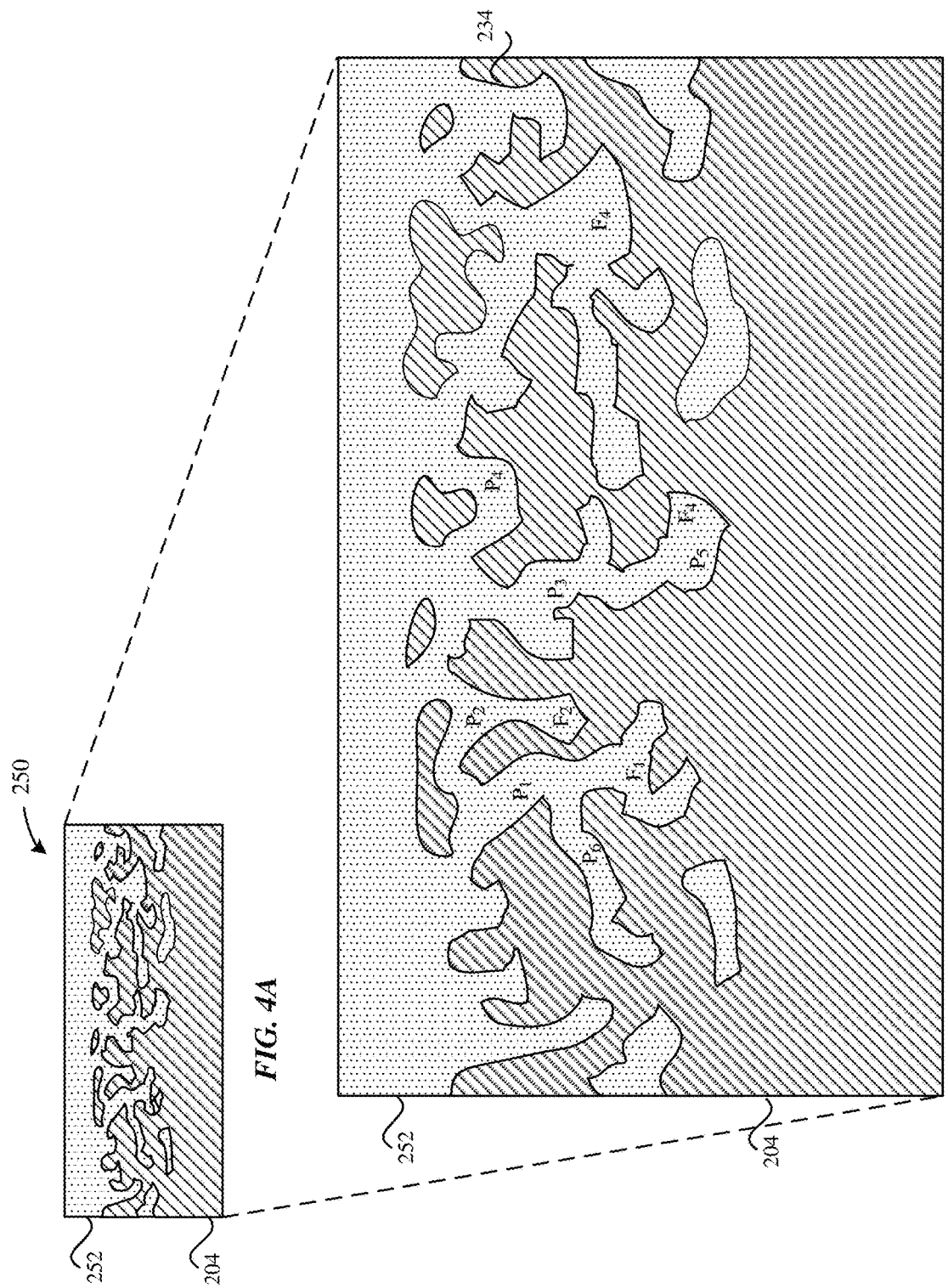

TITANIUM PART HAVING AN ETCHED SURFACE

CROSS-REFERENCE TO RELATED APPLICATION(S)

This claims priority to U.S. Provisional Patent Application No. 62/871,594, filed 8 Jul. 2019, and entitled "TITANIUM PART HAVING AN ETCHED SURFACE," the entire disclosure of which is hereby incorporated by reference.

FIELD

The described embodiments relate generally to etching a surface of a titanium part. More particularly, the described embodiments relate to techniques for forming an interconnected network of channels throughout the titanium part by using an electrochemical etching process.

BACKGROUND

Enclosures for portable electronic devices may be formed from a combination of metal and non-metal materials. However, metal lacks a natural ability to attach to these non-metal materials. Moreover, conventional techniques for modifying metal parts, in an attempt to provide a strong attachment between these metal parts and non-metal parts, have proved unsuccessful. In one example, surfaces of these metal parts may be superficially roughened. However, this superficial roughness is hardly sufficient to provide the ideal structure for bonding metal parts to non-metal parts.

SUMMARY

The described embodiments relate generally to etching a surface of a titanium part. More particularly, the described embodiments relate to techniques for forming an interconnected network of channels throughout the titanium part by using an electrochemical etching process.

According to some embodiments, a titanium alloy substrate for a portable electronic device is described. The titanium alloy substrate includes an exterior surface and a branching channel structure that includes a first channel and a second channel, where the first channel is defined by a first channel wall that extends away from a first opening in the exterior surface, and the second channel is defined by a second channel wall that extends away from a second opening in the first channel wall.

According to some embodiments, an enclosure for a portable electronic device is described. The enclosure includes a first portion including a metal substrate, the metal substrate including an interconnected network of channels. According to some embodiments, the channels include a first channel defined by a first channel wall, where the first channel wall extends from a first opening in an external surface of the metal substrate and terminates at a first terminus surface within the metal substrate, and a second channel defined by a second channel wall, where the second channel wall extends between a second opening in the external surface of the metal substrate and a third opening in the first channel wall. According to some embodiments, the enclosure further includes a second portion including protruding features that extend through the first and second openings and into the first and second channels.

According to some embodiments, a method for forming a part for a portable electronic device, the part including a titanium alloy substrate, is described. The method includes exposing an exterior surface of the titanium alloy substrate to an electrochemical etching process, where the electrochemical etching process forms (i) an opening in the exterior surface and a first channel defined by a first channel wall that extends from the opening, and (ii) an opening in the first channel wall and a second channel defined by a second channel wall that extends from the opening in the first channel wall.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

FIGS. 3A-3B illustrate various views of an etched metal part, in accordance with some embodiments.

FIGS. 4A-4B illustrate various views of an etched metal part that is locked to a non-metal part, in accordance with some embodiments.

DETAILED DESCRIPTION

Figure 1:
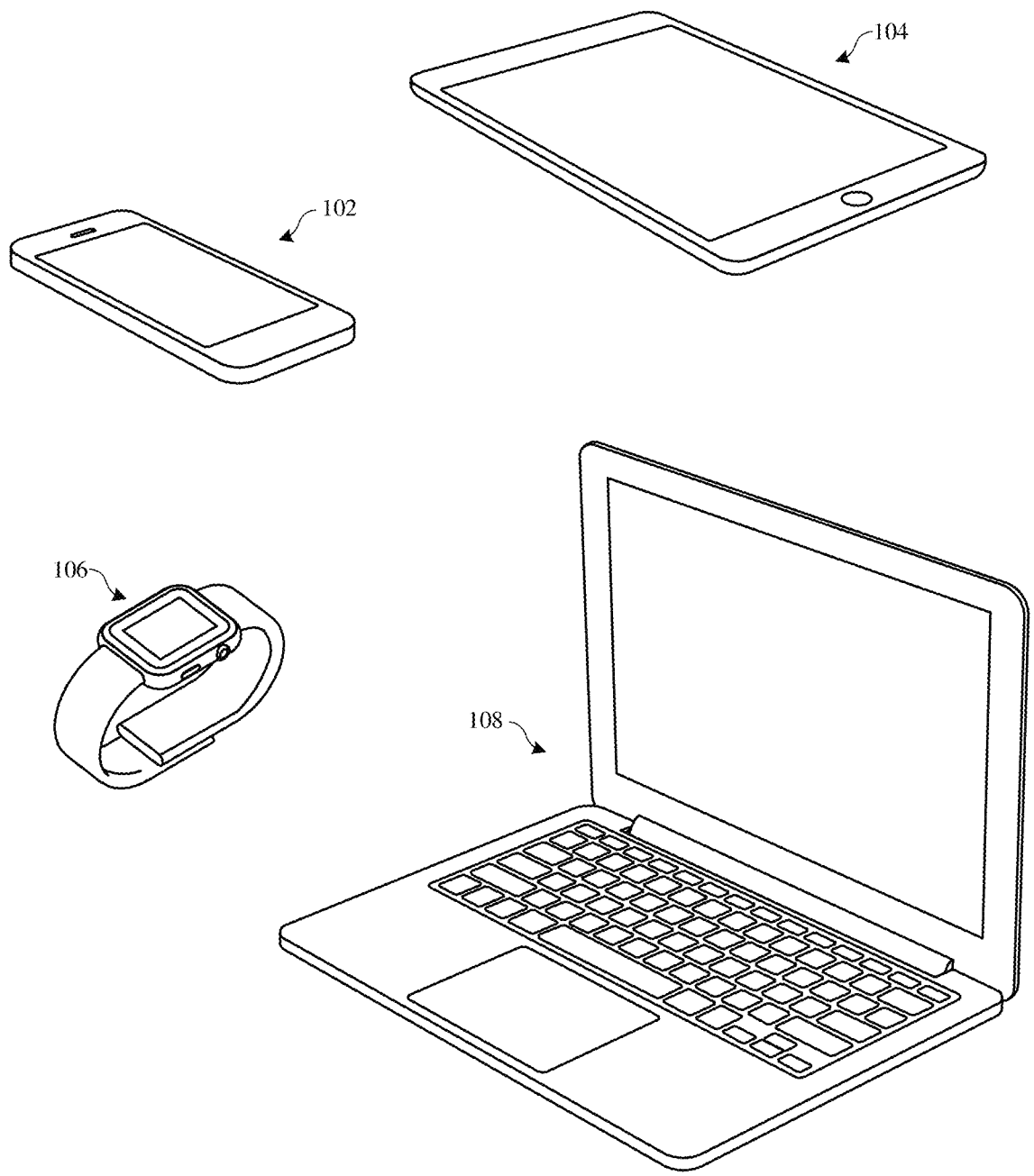
FIG. 1 illustrates perspective views of various portable electronic devices having enclosures that may be processed using the techniques described herein, in accordance with some embodiments.

Representative applications of methods and apparatuses according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Enclosures for portable electronic devices may be formed from a variety of different materials. In certain instances, the enclosure may be formed from titanium, which is attractive over stainless steel and aluminum due to titanium's high strength-to-weight ratio. Additionally, the enclosure may also be formed from a non-metal material, such as glass or a polymer. For example, display assemblies of portable electronic devices may be bonded to a titanium frame of an enclosure. The titanium frame may be sub-divided into various electrically isolated parts such as to prevent electromagnetic interference of antenna(s) carried within the enclosure. For instance, titanium may be used to form a structural band around the edges of the enclosure such that the display is bonded to one face, and a glass is bound to the opposing face. Additionally, a polymer material may be used to form electrical insulating splits that interlock the separate portions of the titanium frame together. The polymer material may be used as a dielectric material that prevents electromagnetic interference.

In order for the structural band to impart the enclosure with sufficient structural strength, robustness, rigidity, and heat and moisture-resistance throughout its lifetime, the enclosure requires a strong adhesive bond to be formed between the metal (e.g., titanium) and the non-metal material (e.g., polymer). Indeed, these requirements are even more technically challenging to satisfy in the face of additional insulating splits (for improved antenna performance) and even smaller areas of adhesion (to minimize weight and space). Moreover, the increasing need for water-resistant enclosures demands that these adhesive bonds must not only maintain strength, but also prevent moisture leakage—even after the enclosure has been subjected to many strain cycles. Thus, there is an increased emphasis in more robust metal to non-metal bonding.

However, conventional attempts to interlock titanium parts to a polymer layer have proved generally unsuccessful. In particular, unlike aluminum which can be etched and/or anodized to provide improved adhesion to the polymer layer, no such processes exist for titanium. Indeed, prior attempts to etch titanium have proved unsuccessful because the resulting surface of the etched titanium exhibits only superficial markings (e.g., scalloped textures). These scalloped textures are shallow (i.e., less than 1 micrometer in depth) and, therefore, fail to provide the necessary surface structure required to bond the titanium part to the polymer material. In other words, the surface of the titanium part is still too smooth and too flat.

Another contributing problem towards etching titanium is that titanium and its alloys thereof are characterized as having a high specific strength and stiffness. For example, titanium has a Vickers hardness number of ~350 HV1. Thus, titanium can function as a protective coating to protect internal operational components carried by the enclosures, for example, when these portable electronic devices are dropped, scratched, chipped, or abraded. However, due to this hardness, it is also difficult to polish and/or machine the surface of the titanium substrate using conventional techniques. Indeed, the relative hardness of titanium relative to other metals allows for only a limited amount of roughening using conventional techniques. Titanium is also highly resistant to corrosion. Accordingly, there are a limited range of possible chemicals and electrochemical etchants that can be used to etch titanium to the extent necessary to achieve a high degree of roughness of the external surface of the titanium part. In particular, the resistance to attack by chloride solutions is one of the main benefits of using titanium as an engineering alloy.

The embodiments described herein set forth techniques for etching an external surface of a substrate that includes titanium such as to form an interconnected network of channels within the substrate. In particular, the techniques involve using an electrochemical etching process to etch a thin metal oxide layer that overlays the substrate. The electrochemical etching process is a controlled process for etching the substrate, such as by controlling parameters that include temperature, voltage, and concentration of the etchant solution. Controlling these parameters can be used to control the depth, diameter, and/or concentration of the pore structures formed within the substrate. It should be noted that the techniques in the embodiments described herein can prevent over-etching of the external surface of the substrate. Over-etching of the external surface may be undesirable in that it significantly reduces the number of pore structures within the substrate, thereby, reducing potential attachment strength between the metal part and the non-metal material relative to an external surface having a moderate amount of etching. In some examples, over-etching of the external surface is characterized by multiple openings at the external surface that overlap one another at a single region. Moreover, over-etching of the metal substrate can compromise the structural integrity and/or hardness of the metal substrate.

As used herein, the terms anodic film, anodized film, anodic layer, anodized layer, anodic oxide coating, anodic layer, anodic oxidized layer, metal oxide layer, oxide film, oxidized layer, and oxide layer can be used interchangeably where appropriate. In one example, an anodized layer can result from an electrochemical anodization process of aluminum or an aluminum alloy. In another example, metal oxide layers can result from a non-electrolytic passivation process. The metal substrate can include any of a number of suitable metals or metal alloys thereof such as aluminum, titanium, steel, and the like. It should be noted that the processes for forming an anodized layer and a metal oxide layer may be different. As used herein, the terms segment, region, and section can also be used interchangeably where appropriate.

According to some embodiments, a titanium alloy substrate for a portable electronic device is described. The titanium alloy substrate includes a titanium alloy substrate for a portable electronic device is described. The titanium alloy substrate includes an exterior surface and a branching channel structure that includes a first channel and a second channel, where the first channel is defined by a first channel wall that extends away from a first opening in the exterior surface, and the second channel is defined by a second channel wall that extends away from a second opening in the first channel wall.

These and other embodiments are discussed below with reference to FIGS. 1-8; however, those skilled in the art will readily appreciate that the detailed description given herein with respect to these figures is for explanatory purposes only and should not be construed as limiting.

FIG. 1 illustrates various portable electronic devices that can be processed using the techniques as described herein. The techniques as described herein can be used to process surfaces of enclosures of the portable electronic devices. In some examples, the enclosures can include at least one of a metal, a metal alloy, a polymer, glass, ceramics, or a thermoplastic. In particular, the enclosures can include a metal part that is attached to a non-metal part. In some examples, the non-metal part can include a polymer. In some examples, the techniques described herein may be used to color the metal surfaces by causing color particles (e.g., water-soluble pigments, dye, etc.) to become absorbed within the metal surfaces.

FIG. 1 illustrates exemplary portable electronic devices including a smartphone 102, a tablet computer 104, a smartwatch 106, and a portable computer 108 that include enclosures that may be processed using the techniques as described herein. These exemplary portable electronic devices may be capable of using personally identifiable information that is associated with one or more users. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Surface(s) of the portable electronic devices described herein may assume any number of desired surface geometries and surface finishes. In some examples, the enclosures may have a three-dimensional structure having a height, width, and depth, and any type of geometry. In particular, the enclosures is characterized as rectangular, polygonal, circular, beveled edges, angular edges, elliptical, etc.

According to some embodiments, the metallic surfaces of the enclosures of portable electronic devices can include a metal substrate. In some examples, the metal substrate can include a titanium substrate or a titanium alloy substrate. Titanium and its alloys thereof are characterized as having a high specific strength and stiffness, which makes titanium an attractive choice for the enclosures of the exemplary portable electronic devices described herein. For example, titanium has a Vickers hardness number of ~350 HV1. Thus, titanium can function as a protective coating to protect internal operational components carried by the enclosures, for example, when these portable electronic devices are dropped, scratched, chipped, or abraded. However, due to this hardness, it is also difficult to polish and/or machine the surface of the titanium substrate using conventional techniques. Indeed, the relative hardness of titanium relative to other metals allows for only a limited amount of roughening using conventional techniques. Additionally, titanium is highly resistant to many conventional chemical etchants and/or electrochemical surface texturing techniques. Indeed, conventional surface treatments for titanium generate shallow and superficial markings into the surface of the titanium substrate.

Accordingly, despite titanium being an attractive and desirable metal for enclosures for portable electronic devices, it is difficult to bond other materials (e.g., polymers, glass, etc.) to titanium substrates that have superficial markings. Consequently, the bond strength (as measured in pull strength) is very weak. The techniques described herein are utilized to etch the external surface of the titanium substrate to a high degree of roughness.

FIGS. 2A-2I illustrate cross-sectional views of a process for forming an etched metal part, in accordance with some embodiments. In some embodiments, a metal part 200 that is processed has a near net shape of a final part, such as the enclosures of the portable electronic devices 102, 104, 106, and 108.

Figure 2A:
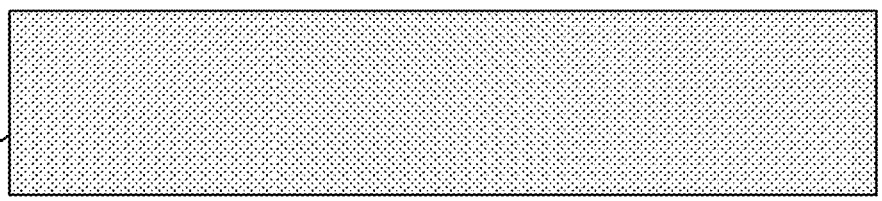
FIGS. 2A-2I illustrate exemplary cross-sectional views of a process for forming an etched metal part, in accordance with some embodiments.

FIG. 2A illustrates a cross-sectional view of a metal part 200 prior to undergoing a process for forming an etched surface. In some examples, the metal part 200 includes a metal substrate 204. The metal substrate 204 may include titanium. However, it should be noted that the use of pure titanium in the metal substrate 204 may not only be undesirable, but also near impossible to form the etched titanium surface as described herein, because pure titanium is very chemically inert. In other words, pure titanium is not very chemically reactive. Accordingly, the metal substrate 204 may preferably include a titanium alloy, in some embodiments. Indeed, certain titanium alloys are characterized as having two-phases (α-phase and β-phase), which may be desirable for forming the etched titanium surface described herein, according to some embodiments. The αβ titanium alloy may be formed as a result of incorporating certain elements (e.g., C, N, O, Al, etc.) to pure titanium. One example of a αβ titanium alloy is Ti6Al4V alloy.

FIG. 2A illustrates the metal substrate 204 subsequent to machining (e.g., CNC machining) an unfinished metal part such that the metal substrate 204 is characterized as having a near net shape of the enclosures of the portable electronic devices described herein. According to some examples, the metal substrate 204 may exposed to one or more processing steps, such as degreasing or alkaline cleaning, and subsequently, cold water rinses to remove any machining oils and remove surface contaminants from the external surface 202.

Figure 2B:
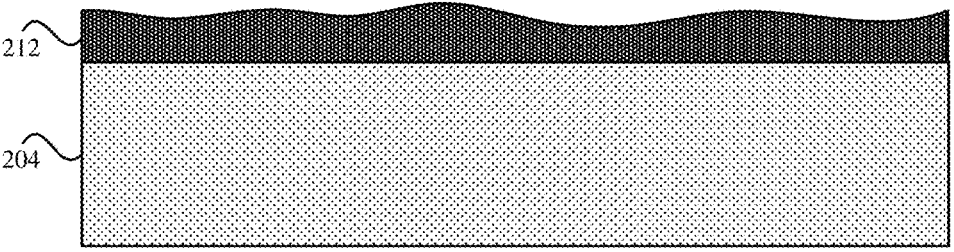

FIG. 2B illustrates a cross-sectional view of an oxidized part 210, in accordance with some embodiments. In particular, the oxidized part 210 can include a metal oxide layer 212 that is disposed over the metal substrate 204 as a result of a non-electrolytic natural oxidation process. In some examples, the external surface 202 of the substrate 204 may be cleaned prior to undergoing the non-electrolytic natural oxidation process. In some examples, during the non-electrolytic natural oxidation process, the metal substrate 204 is oxidized to form a native metal oxide layer through a spontaneous process by exposing the metal substrate 204 to air or moisture. According to some embodiments, titanium ions present in the metal substrate 204 may readily react with oxygen, which is present in water and/or air, thereby forming a titanium oxide. The metal oxide layer 212 that includes titanium oxide may also be referred to as a passivation layer.

FIG. 2B illustrates that the metal oxide layer 212 is characterized as having a non-uniform thickness due to the spontaneous nature of the non-electrolytic, natural oxidation process. In some examples, the metal oxide layer 212 may grow in thickness and/or density from between about 3 nm to about 9 nm in thickness. However, the non-uniform thickness of the metal oxide layer 212 may reduce the susceptibility of the metal substrate 204 to an electrochemical etching process, as described herein.

Figure 2C:
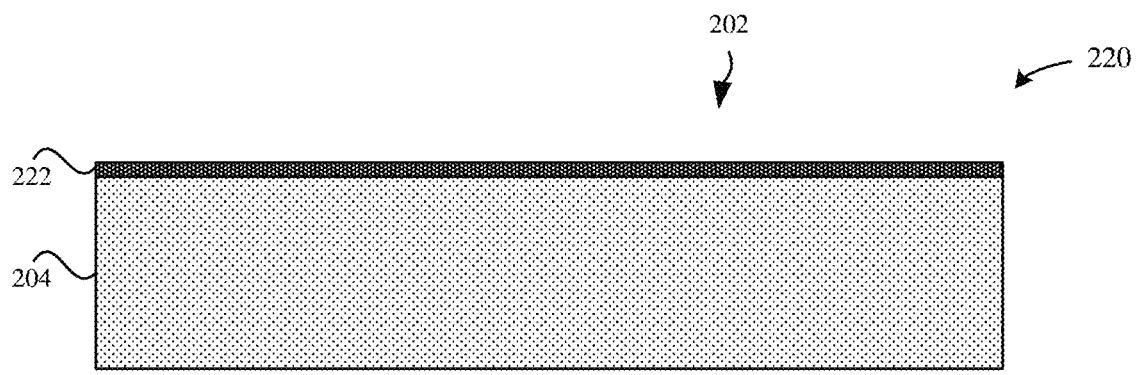

FIG. 2C illustrates a cross-sectional view of a modified oxidized part 220, in accordance with some embodiments. The modified oxidized part 220 includes the metal oxide layer 212. However, in contrast to the metal oxide layer 212 of the oxidized part 210, the metal oxide layer 212 of the modified oxidized part 220 has a substantially uniform thickness. In particular, the metal oxide layer 212 is exposed to an acidic etching process that strips or etches away a portion of the metal oxide layer 212, thereby reducing the thickness of the metal oxide layer 222. In some embodiments, the acidic etching process causes, at best, slight or shallow roughening or etching of the external surface 202 of the metal substrate 204. It should be noted that the textures of the external surface 202 caused by the acidic etching process are insufficient to provide the necessary pull strength to bond to a polymer material for a portable electronic device enclosure. As a result of the acidic etching process, the metal oxide layer 222 has a uniform thickness that is between about 4 micrometers to about 5 micrometers.

According to some examples, the acidic etching process includes exposing the oxidized part 210 to a sulfuric acid solution (98% $H_2SO_4$) at a temperature of about 70° C. at a duration between about 3 minutes to about 30 minutes. In some examples, the acidic etching process may utilize a phosphoric acid solution. As a result of the acidic etching process, the oxidized part 210 has a uniform thickness or a substantially uniform thickness. Beneficially, the thin and uniform thickness of the metal oxide layer 212 enables for subsequent electrochemical etching to generate a pore structure having desirable properties as described herein.

Figure 2D:
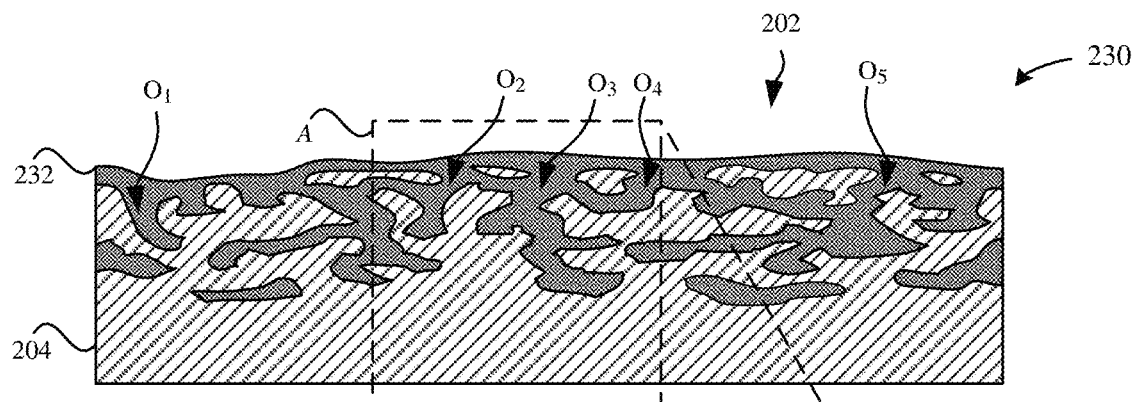
Figure 2E:
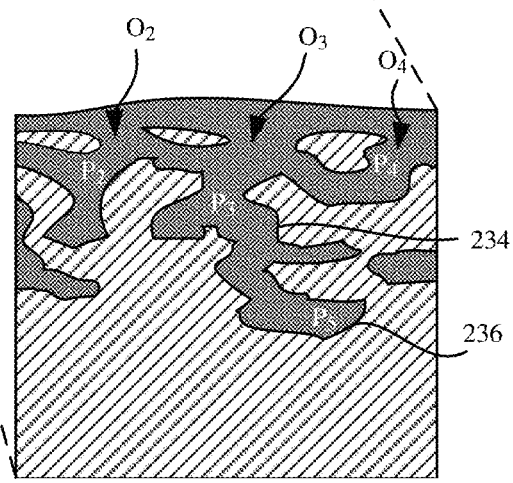

FIGS. 2D-2E illustrate various views of an etched part 230, in accordance with some embodiments. In particular, FIG. 2D illustrates a cross-sectional view of the etched part 230 subsequent to an electrochemical etching process. The electrochemical etching process may also be referred to as an anodizing step. Thus, in some examples, anodizing or an anodizing step may refer to a process that uses etchants during an anodizing process. In some examples, such an anodizing step can produce a gel-like product which penetrates the original metal surface, and which can subsequently be removed to reveal an intricate surface structure there below. During the electrochemical etching process, the modified oxidized part 220 may be exposed to an etching solution that attacks substantially the entire external surface 202, that may include a sodium chloride solution, or other halide and bromide solutions. In one example, the electrochemical etching process includes immersing the modified oxidized part 220 in a 100 g/L solution of sodium chloride with graphite as a counter-electrode at a temperature between 65° C.-75° C. for a duration between about 1-3 minutes at a high voltage (e.g., between 10 V-15 V anodic potential). As would be understood by one of ordinary skill in the art, etching the modified oxide part 220 for less than 1 minute results in the formation of shallow pore structures. Consequently, the shallow pore structures may not be able to provide sufficient pull strength to adhere to a polymer layer. Conversely, etching the modified oxidized part 220 for longer than 3 minutes may result in completely etching the entire external surface 202 of the modified oxidized part 220.

As illustrated in FIG. 2D, the external surface 202 of the etched part 230 is etched to form randomly distributed openings—$O_1$, $O_2$, $O_3$, $O_4$—throughout the external surface 202. The electrochemical etching process exploits the ease of anodizing titanium, in particular, the relative reactivity of the metal oxide layer 212 (that includes titanium) as compared to bulk titanium. The electrochemical etching process preferentially attacks the aluminum-rich, β-phase of the metal substrate 204. The electrochemical etching process preferentially etches away the β-phase of the metal substrate 204 while leaving predominantly the α-phase as titanium metal. Preferentially etching the β-phase of the metal substrate 204 can be used to control the size and density of the pore structures in the metal substrate 204.

As a result, the external surface 202 of the etched part 230 includes randomly distributed openings—$O_1$, $O_2$, $O_3$, $O_4$—throughout the external surface 202. The openings—$O_1$, $O_2$, $O_3$, $O_4$—extend through the metal substrate 204 and may each lead to channels that are interconnected to each other. In some examples, the channels are branching so as to define an open cell network. The open cell network contrasts from a closed cell network that is defined as pores that are enclosed by walls. As illustrated in FIG. 2D, the etched part 230 may also be characterized as having a labyrinth of channels or a coral-like network of channels. It should be noted that the etched part 230 has a non-uniform thickness throughout. The external surface 202 of the etched part 230 is also non-planar due to the etching process.

In some examples, the channels are defined by walls having a serpentine shape or a non-linear shape. In some examples, the walls that define the channels have an irregular (i.e., non-uniform) thickness. Each of the channels may branch from another channel (i.e., a channel diverges from another channel) so as to define an interconnected network of channels. In some examples, each of the channels extend from an opening at the external surface 202 and towards a terminus surface within the metal substrate 204.

As illustrated in FIG. 2D, as a result of etching the metal substrate 204 using the electrochemical etching process, the channels of the metal substrate 204 are thoroughly plugged with a smut 232 of dense carbon and oxygen-rich residue. The smut 232 is an oxide/carbide that generally fills the channels. However, the smut 232 must be removed in order to fully expose the channels of the metal substrate 204, as will be described herein.

FIG. 2E illustrates a magnified cross-sectional view of a region A of the etched part 230 of FIG. 2D. In particular, FIG. 2E illustrates that openings—$O_2$, $O_3$, $O_4$—extend through the metal substrate 204 and lead to channels—$P_2$, $P_3$, $P_4$, $P_5$—that are interconnected to each other. The channels—$P_2$, $P_3$, $P_4$, $P_5$—may be characterized as having an irregular shape (i.e., non-uniform) due to the etching process. The channels—$P_2$, $P_3$, $P_4$, $P_5$—may extend to a depth of up to 20 micrometers into the metal substrate 204. The channels—$P_2$, $P_3$, $P_4$, $P_5$—are distinguished from scallops or craters. Scallops may extend downwards to a depth of 1 micrometer into the metal substrate 204. Moreover, scallops are not interconnected to each other. Additionally, the openings—$O_2$, $O_3$, $O_4$—may have an average diameter between about 1 micrometer to 20 micrometers.

As shown in FIG. 2E, each of the channels—$P_2$, $P_3$, $P_4$—are defined by walls 234. The walls 234 extend from the external surface 202 and terminate at a terminus surface 236. In some embodiments, the walls 234 may be etched and textured to have a high degree of roughness as a result of the electrochemical etching process. Beneficially, the textured walls 234 may facilitate in providing greater retention with protruding features of the polymer layer, as will be described herein. In some embodiments, the walls 234 of each of the channels—$P_2$, $P_3$, $P_4$—have multi-angle side surfaces that define a serpentine path. As illustrated in FIG. 2E, some of the channels—$P_2$, $P_3$, $P_4$—may share a common wall 234. In some embodiments, the respective wall 234 that defines each of the channels—$P_2$, $P_3$, $P_4$—may diverge or extend from another wall 234. For example, the channel—$P_4$—has a wall 234 that merges into the wall 234 that defines the channel—$P_3$.

As shown in FIG. 2E, the channel—$P_4$—includes an opening—$O_4$—at the external surface 202 and an additional opening at the wall 234 that defines the channel—$P_3$. In this manner, by way of the additional opening, the channel—$P_4$—is interconnected to the channel—$P_3$. Unlike the other channels (e.g., $P_2$, $P_3$, $P_4$), the channel—$P_5$—does not include an opening at the external surface 202. As shown in FIG. 2E, the channel—$P_5$—includes an opening at the wall 234 that defines the channel—$P_3$. Thus, during the electrochemical etching process, the channel—$P_5$— may be formed, at least in part, concurrently with the formation of the channel—$P_3$.

Figures 2F, 2G:
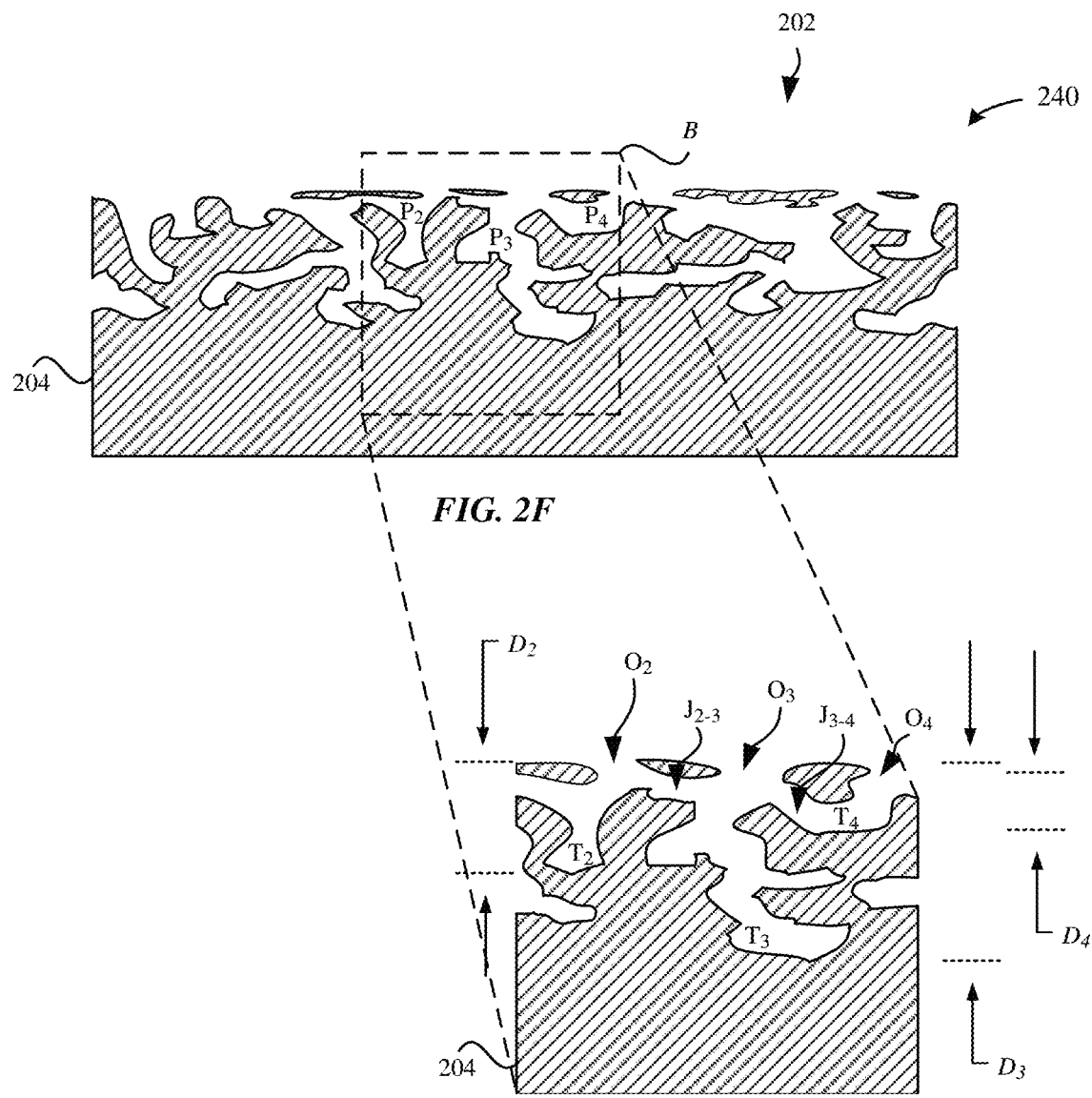

FIGS. 2F-2G illustrate various views of a cleaned etched part 240, in accordance with some embodiments. In particular, FIG. 2F illustrates a cross-sectional view of the cleaned etched part 240 subsequent to a cleaning process. The cleaning process includes dissolving the smut 232 through a de-oxidation process. In some examples, the etched part 230 is cleaned by immersion using nitric acid or other etchant. Other alternative cleaning solutions include hot hydrochloric acid, phosphoric acid, and sulfuric acid. As a result of the cleaning process, the smut 232 is completely dissolved from the cleaned etched part 240. In one example, the use of hydrochloric acid as the cleaning solution may completely dissolve any remnants of the sodium chloride solution used to etch the metal substrate 204.

FIG. 2G illustrates a magnified cross-sectional view of a region B of the cleaned etched part 240 of FIG. 2F. In particular, FIG. 2G illustrates the removal of the smut 232 from the channels—$P_2$, $P_3$, $P_4$. It should be noted that the cleaning process does not affect impact the shape and/or structure of the metal substrate 204 and the walls 234 that define the channels—$P_2$, $P_3$, $P_4$. The channels—$P_2$, $P_3$, $P_4$—may be connected through junctions. The junctions may refer to a bridged region that connects adjacent channels so as to define the interconnected network of channels. For example, the channels $P_{2,3}$ may be connected with junction $J_{2-3}$. In another example, the channels $P_{3,4}$ may be connected with junction $J_{3-4}$. In some embodiments, the junctions may also be referred to as channels. However, the junctions do not terminate at a terminus surface within the metal substrate 204. Instead the junctions may be defined by a channel wall (or junction wall) that extends between a first opening at a wall 234 and a second opening at another wall 234.

As illustrated in FIG. 2G, the external surface 202 of the cleaned etched part 240 is non-planar. Moreover, the openings—$O_2$, $O_3$, $O_4$—are randomly distributed throughout the external surface 202. As a result, each of the openings—$O_2$, $O_3$, $O_4$—are disposed at different heights of the external surface 202. Furthermore, each of the channels—$P_2$, $P_3$, $P_4$ that correspond to the openings—$O_2$, $O_3$, $O_4$—terminate at different depths. For example, the pore $P_2$ has an opening $O_2$ at the external surface 202 and terminates at a terminus surface $T_2$. The pore $P_2$ is characterized as having a depth of $D_2$. In contrast, the pore $P_3$ has an opening $O_3$ at the external surface 202 and terminates at a terminus surface $T_3$. The pore $P_3$ is characterized as having a depth of $D_3$ that is different from $D_2$. Moreover, the pore $P_4$ has an opening $O_4$ at the external surface 202 and terminates at a terminus surface $T_4$. The pore $P_4$ is characterized as having a depth of $D_4$ that is different from $D_2$ and $D_3$. As is understood by one of ordinary skill in the art, because the channels—$P_2$, $P_3$, $P_4$—start at different heights along the external surface 202 and terminate at different bottoms, this differentiates electrochemical etching from techniques for etching stainless steel and aluminum. Indeed, the scattered and varied etching sites results in channels that are formed in different directions. As a result of the scattered bonding sites, bonding strength of the metal substrate 204 to a polymer layer can be relatively strong. The depth of the channels may also be adjusted by controlling the etching of the β-phase of the metal substrate 204.

According to some examples, the channels—$O_2$, $O_3$, $O_4$—are characterized as having an average diameter that is less than an average depth of the channels—$P_2$, $P_3$, $P_4$. According to some examples, the openings—$O_2$, $O_3$, $O_4$—are characterized as having non-uniform diameters. According to some embodiments, a majority of the external surface 202 of the cleaned etched part 240 includes openings that lead to channels. It should be noted that the number of openings formed on the external surface 202 does not substantially sacrifice the rigidity and/or hardness of the cleaned etched part 240 as requisite for an enclosure for a portable electronic device. Additionally, the interconnected porosity of the cleaned etched part 240 is of sufficient scale to enable penetration of polymer material during a mechanical interlocking between metal and a non-metal part.

Figure 2H:
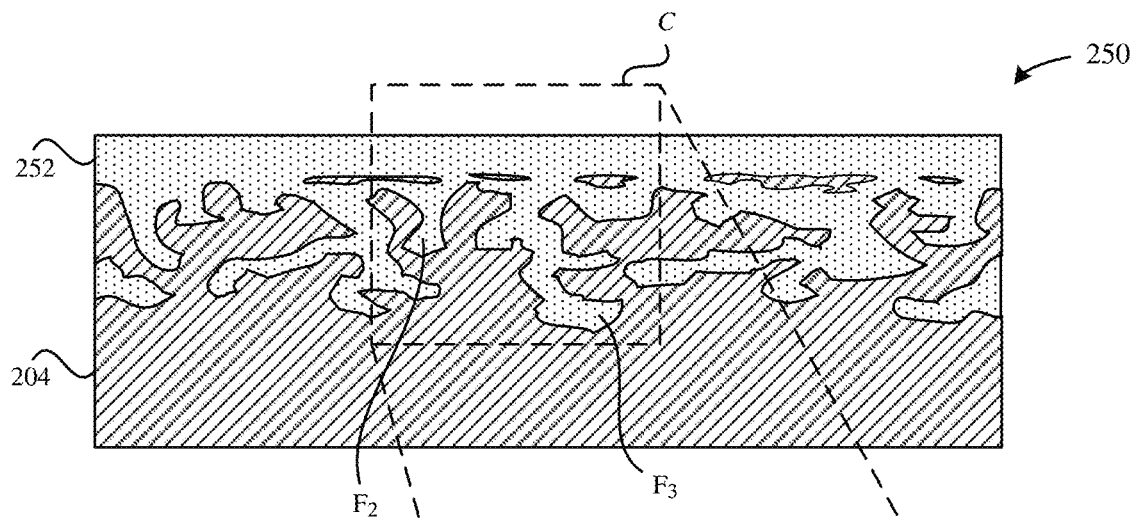
Figure 2I:
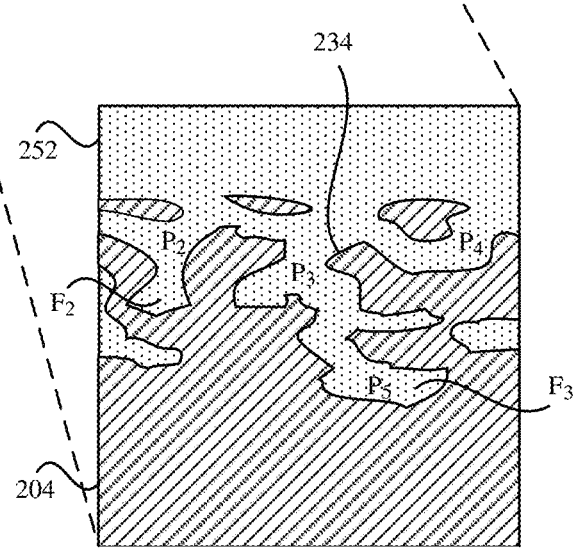

FIGS. 2H-2I illustrate various views of a multi-layer part 250, in accordance with some embodiments. In particular, FIG. 2H illustrates a cross-sectional view of the multi-layer part 250 subsequent to a process that involves bonding or attaching a non-metal layer 252 to the cleaned etched part 240. As illustrated in FIG. 2H, the non-meta layer 252 is disposed over the metal substrate 204. In some examples, the non-metal layer 252 is characterized as a bulk layer having protruding features. For example, the non-metal layer 252 can refer to a dual-state material such as a polymer material. Examples of polymer material include polyethylene terephthalate ("PET"), polyaryletherketone ("PAEK"), or polyether ether ketone ("PEEK"). While the polymer material is in a liquid state, the polymer material flows into and substantially fills the channels—$P_1$, $P_2$, $P_3$, $P_4$. In some examples, the non-metal layer 252 can have any amount of viscosity or surface tension that is sufficient to attach to the external surface 202 of the cleaned etched part 240. After flowing into these channels, the polymer material is allowed to harden into protruding portions or attachment features—$F_2$, $F_3$. As illustrated in FIG. 2H, the non-metal layer 252 in the solid state can be disposed so that it is relatively flush against the external surface 202 of the metal substrate 204. The multi-layer part 250 that is formed as a result may have an external surface that corresponds to an external surface of the portable devices—e.g., 102, 104, 106, and 108.

FIG. 2I illustrates a magnified cross-sectional view of a region C of the multi-layer part 250 of FIG. 2H. As illustrated in FIG. 2I, the attachment features—$F_2$, $F_3$—fill and are carried within the channels—$P_2$, $P_3$. The channels are capable of both capturing and retaining the non-metal layer 252 due to the geometry of the channels and the textured surfaces of the walls 234. In some embodiments, the geometry of the channels and the textured surfaces of the walls 234 makes it considerably more difficult to pull or separate the non-metal layer 252 from the cleaned etched part 240.

FIGS. 3A-3B illustrate various views of a cleaned etched part, in accordance with some embodiments. In some examples, FIG. 3A illustrates the cleaned etched part 240 of FIG. 2F. As illustrated in FIG. 3A, the cleaned etched part 240 includes a metal substrate 204 having an external surface 202 that is etched to form randomly distributed openings—$O_1$, $O_2$, $O_3$, $O_4$. Each of the openings—$O_1$, $O_2$, $O_3$, $O_4$—may extend into a respective channel—$P_1$, $P_2$, $P_3$, $P_4$—that is characterized as having a serpentine path. The channels—$P_1$, $P_2$, $P_3$, $P_4$—may be interconnected to each other so as form an open cell network of branching channels. It should be noted that the external surface 202 of the cleaned etched part 240 is not generally planar. Indeed, in some embodiments, it may not be preferable to subject the cleaned etched part 240 to a machining, buffing, and/or polishing process that would otherwise modify the external surface 202. Moreover, it may not be preferable to subject the channels—$P_1$, $P_2$, $P_3$, $P_4$—of the cleaned etched part 240 to a sealing process that involves sealing the openings of the channels—$P_1$, $P_2$, $P_3$, $P_4$. In particular, the uneven and random texture of the external surface 202 may promote greater bonding between the non-metal layer 252 and the cleaned etched part 240 relative to an etched part having a planarized external surface. For example, because the walls 234 that define the channels—$P_1$, $P_2$, $P_3$, $P_4$—are textured or etched, the wall 234 that define the openings—$O_1$, $O_2$, $O_3$, $O_4$—within the external surface 202 may provide more grooves, and thus greater surface area for adhesion to the polymer material of the non-metal layer 252.

FIG. 3B illustrates a magnified cross-sectional view of the cleaned etched part 240, in accordance with some embodiments. As illustrated in FIG. 3B, the channels—$P_1$, $P_2$, $P_3$, $P_4$, $P_5$—extend through the metal substrate 204 according to a serpentine path to varying depths. Additionally, each of the channels—$P_1$, $P_2$, $P_3$, $P_4$, $P_5$—is defined by walls 234 having a textured or etched surface. In some examples, each wall 234 includes multiple sides oriented at different angles that can act as grooves to retain and capture polymer material of the non-metal layer 252. In some examples, fine scale (sub-micron) roughness and porosity is observed on the walls 234. In some examples, the channels may also be referred to as channels or tunnels. The channels—$P_1$, $P_2$, $P_3$, $P_4$, $P_5$—extending through the metal substrate 204 should not be confused for pore structures or nanotubes of an anodized layer due to their different chemistry, microstructure, and cause of formation. The channels—$P_1$, $P_2$, $P_3$, $P_4$—may be connected via bridged region. For example, the channels $P_{2,3}$ may be connected with a bridged region referred to as junction $J_{2-3}$. Additionally, FIG. 3B illustrates that the openings—$O_1$, $O_2$, $O_3$, $O_4$—are separated by a non-uniform distance due to the random nature of the electrochemical etching process. For example, FIG. 3B illustrates that the openings $O_1$, $O_2$ are separated by a distance $D_{1-2}$ that is different from a distance $D_{2-3}$ that separates the openings $O_2$, $O_3$. In some embodiments, the junction may refer to a channel having an opening at an external surface and an opening at a wall that defines a channel.

As illustrated in FIG. 3B, some of the channels—$P_2$, $P_3$, $P_4$—may share a common wall 234. In some embodiments, the respective wall 234 that defines each of the channels—$P_2$, $P_3$, $P_4$—may diverge or extend from another wall 234. For example, the channel—$P_4$—has a wall 234 that merges into the wall 234 that defines the channel—$P_3$. As shown in FIG. 3B, the channel—$P_4$—includes an opening—$O_4$—at the external surface 202 and an additional opening at the wall 234 that defines the channel—$P_3$. In this manner, by way of the additional opening, the channel—$P_4$—is interconnected to the channel—$P_3$. Unlike the other channels (e.g., $P_2$, $P_3$, $P_4$), the channels—$P_5$, $P_6$—do not include openings at the external surface 202. As shown in FIG. 3B, the channel—$P_5$—includes an opening at the wall 234 that defines the channel—$P_3$. Moreover, the channel—$P_6$—includes an opening at the wall 234 that defines the channel—$P_1$. Thus, during the electrochemical etching process, the channel—$P_6$—may be formed, at least in part, concurrently with the formation of the channel—$P_1$.

FIGS. 4A-4B illustrate various views of a multi-layer part, in accordance with some embodiments. In some examples, FIG. 4A illustrates the multi-layer part 250 of FIG. 2H. The multi-layer part 250 includes a non-metal layer 252 that is bonded to a metal substrate—e.g., the cleaned etched part 240. FIG. 4B illustrates a magnified cross-sectional view of the multi-layer part 250. The non-metal layer 252 includes protruding features—$F_1$, $F_2$, $F_3$, $F_4$—that extend into the openings—$O_1$, $O_2$, $O_3$, $O_4$—of the cleaned etched part 240. The protruding features—$F_1$, $F_2$, $F_3$, $F_4$—are captured and retained within the channels—$P_1$, $P_2$, $P_3$, $P_4$. As illustrated in FIG. 4B, the polymer material of the protruding features—$F_1$, $F_2$, $F_3$, $F_4$—fills in grooves of the walls 234, such as during an injection molding process. As illustrated in FIG. 4B, the non-metal layer 252 is disposed over the metal substrate 204. In some examples, the non-metal layer 252 is characterized as a bulk layer. In some examples, the non-metal layer 252 can have any amount of viscosity or surface tension that is sufficient to attach to the external surface 202 of the cleaned etched part 240. In some embodiments, the geometry of the channels and the textured surfaces of the walls 234 makes it considerably more difficult to pull or separate the non-metal layer 252 from the cleaned etched part 240.

Figure 5:
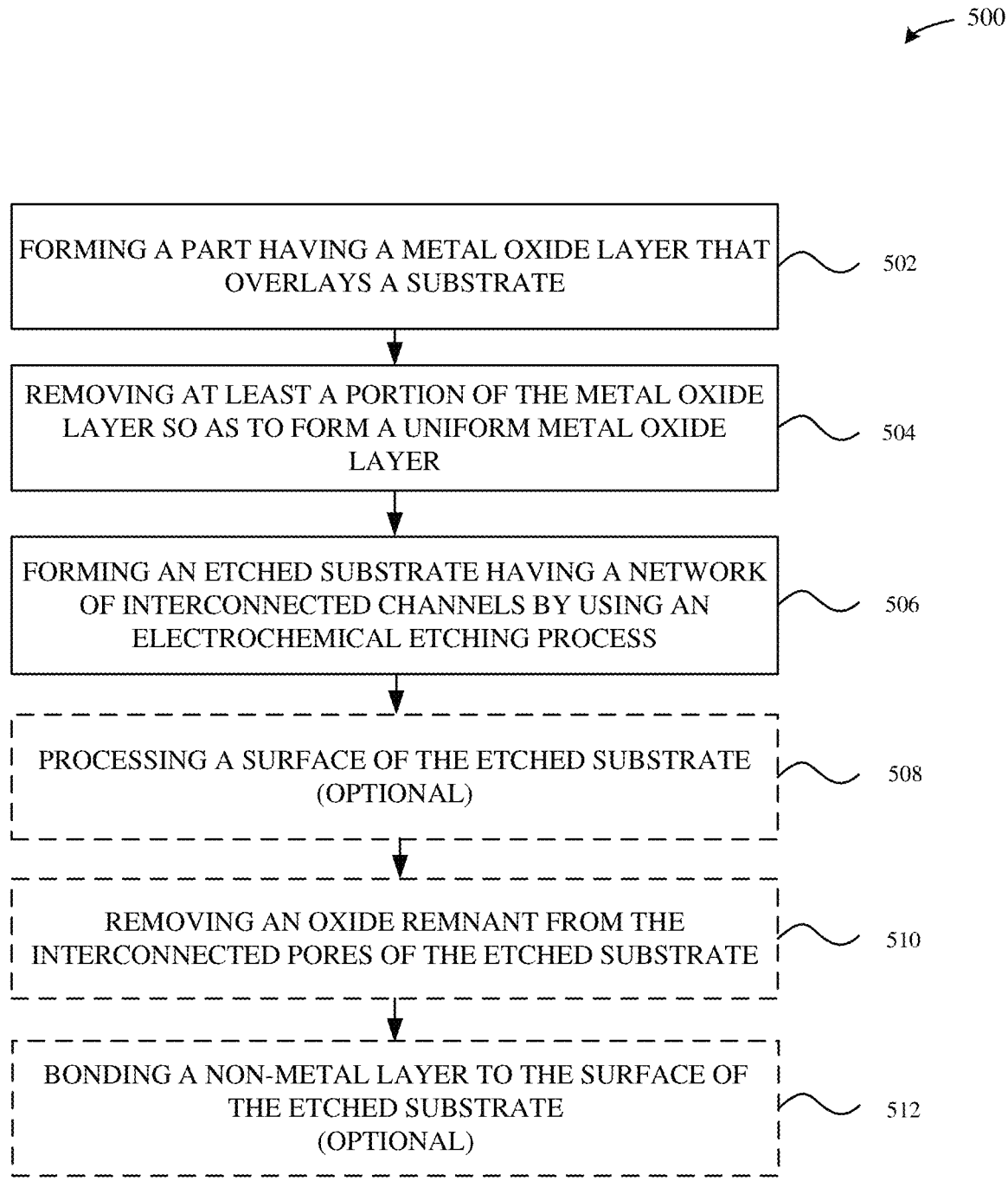
FIG. 5 illustrates a method for forming an etched part, in accordance with some embodiments.

FIG. 5 illustrates a method 500 for forming an etched part, according to some embodiments. As illustrated in FIG. 5, the method 500 begins at step 502, where a part—e.g., a metal substrate 204—is oxidized such as to form an oxidized part 210 having a metal oxide layer 212 that overlays the metal substrate 204. In some examples, the metal oxide layer 212 can be formed by a non-electrolytic natural oxidation process. In some examples, it may be preferable that the metal substrate 204 is an αβ titanium alloy such as a Ti6Al4V alloy. Because the non-electrolytic natural oxidation process is a random process, the metal oxide layer 212 may be characterized as non-porous and having a non-uniform thickness.

At step 504, a portion of the metal oxide layer 212 is removed to form the modified oxidized part 220. The removal step reduces the thickness of the metal oxide layer 212 and also causes the metal oxide layer 212 to have a uniform thickness. Importantly, the uniform thickness of the metal oxide layer 212 promotes a uniform attack of the external surface 202 of the oxidized part 210 by the electrochemical etching process.

At step 506, the modified oxidized part 220 is subjected to an electrochemical etching process. During the electrochemical etching process, the modified oxidized part 220 may be exposed to an etching solution, such as a halide solution (e.g., NaCl, etc.) at a high temperature (i.e., at least 60 C or greater). In some examples, the modified oxidized part is exposed to a heated halide solution for a duration between about 1-3 minutes. As a result of the electrochemical etching process, an open cell network of channels (e.g., $P_1$, $P_2$, $P_3$, $P_4$) are formed throughout the metal substrate 204. In particular, the channels—$P_1$, $P_2$, $P_3$, $P_4$—are interconnected to each other. In some examples, the channels—$P_1$, $P_2$, $P_3$, $P_4$—have average diameters between about 2 to about 5 micrometers in diameter. In some examples, the average diameter is based upon the size of the β-phase of the metal substrate 204. The open cell network of channels may extend to a depth of up to 20 micrometers into the metal substrate 204. Beneficially, this amount of penetration lends the channels—$P_1$, $P_2$, $P_3$, $P_4$—to provide sufficient amount of pull strength to adhere the non-metal layer 252 to the metal substrate 204.

It should be noted that the electrochemical etching process reliance upon a halide or bromide solution described herein teaches away from conventional anodizing. As is understood, conventional anodizing leads to the formation of uniform pores. However, halides are avoided during conventional anodizing because halides will etch away and cause non-uniform channels to form throughout. In contrast, the electrochemical etching process described herein utilizes etchants to form randomly distributed openings (e.g., $O_1$, $O_2$, $O_3$, $O_4$) that lead to interconnected channels.

According to some embodiments, the size and density of the channels—$P_1$, $P_2$, $P_3$, $P_4$—may be controlled by adjusting the amount of etching of the β-phase of the metal substrate 204. It should be noted that pure titanium and other non-dual phase titanium alloys may be unsuitable for forming the open cell network of channels due to the lack of the β-phase. Indeed, exposure of a pure titanium alloy part or even a part formed from a single-phase titanium alloy to the electrochemical etching process may result in uniform etching of the metal substrate, which will not lead to the open cell network of channels. It should be noted that the electrochemical etching process described herein does not etch or target grain structures of the titanium alloy. Subsequent to the electrochemical etching process, the α-phase of the titanium is in an almost pristine state and is responsible for the hardness of the resulting etched part 230. However, the etched part 230 is noticeably weaker due to formation of the open cell network of channels in the metal substrate 204.

According to some embodiments, if the amount of openings and channels in the etched part 230 does not satisfy a threshold amount, then the electrochemical etching process may be continue or be repeated to form additional openings and/or channels at the external surface 202 of the etched part 230. In some examples, 3-D mapping is performed to determine whether a sufficient amount of channels are etched within the metal substrate 204. According to some examples, up to 50% of the external surface 202 may include openings that lead to channels. According to some examples, up to 70% of the external surface 202 may include openings that lead to channels. In some examples, over-etching of the eternal surface 202 (i.e., in excess of >70%) can reduce the hardness of the etched part 230 and also impair pull strength of the etched part 230 bonded to the non-metal layer 252.

At step 508, the etched part 230 may be optionally processed. In particular, subsequent to the electrochemical etching process, the channels—$P_1$, $P_2$, $P_3$, $P_4$—of the metal substrate 204 is thoroughly plugged with a smut 232 of dense carbon and oxygen-rich residue. The smut 232 must be removed in order to fully expose the channels—$P_1$, $P_2$, $P_3$, $P_4$—of the metal substrate 204.

At step 510, the etched part 230 is optionally subjected to a cleaning process. The cleaning process may involve dissolving the smut 232 through a de-oxidation process to form a cleaned etched part 240. In some examples, the etched part 230 is cleaned by immersing the etched part 230 in nitric acid, hydrochloric acid, phosphoric acid, or sulfuric acid. As a result of the cleaning process, the smut 232 is completely dissolved from the cleaned etched part 240.

At step 512, the cleaned etched part 240 may be optionally bonded to a non-metal layer 252 such as to form a multi-layer part 250. In some examples, the non-metal layer 252 is characterized as a bulk layer having protruding features—$F_1$, $F_2$, $F_3$, $F_4$. During a liquid injection molding process, the polymer material is in a liquid state, the polymer material flows into and substantially fills the channels—$P_1$, $P_2$, $P_3$, $P_4$. After flowing into the channels—$P_1$, $P_2$, $P_3$, $P_4$, the polymer material is allowed to harden into protruding features—$F_1$, $F_2$, $F_3$, $F_4$. In some embodiments, the geometry of the channels—$P_1$, $P_2$, $P_3$, $P_4$—and the textured surfaces of the walls 234 makes it considerably more difficult to pull or separate the non-metal layer 252 from the cleaned etched part 240. Thereafter, an optional step may be performed to process the multi-layer part 250. For example, surfaces of the multi-layer part 250 may be finished, buffed, blasted, or polished.

Figure 6:
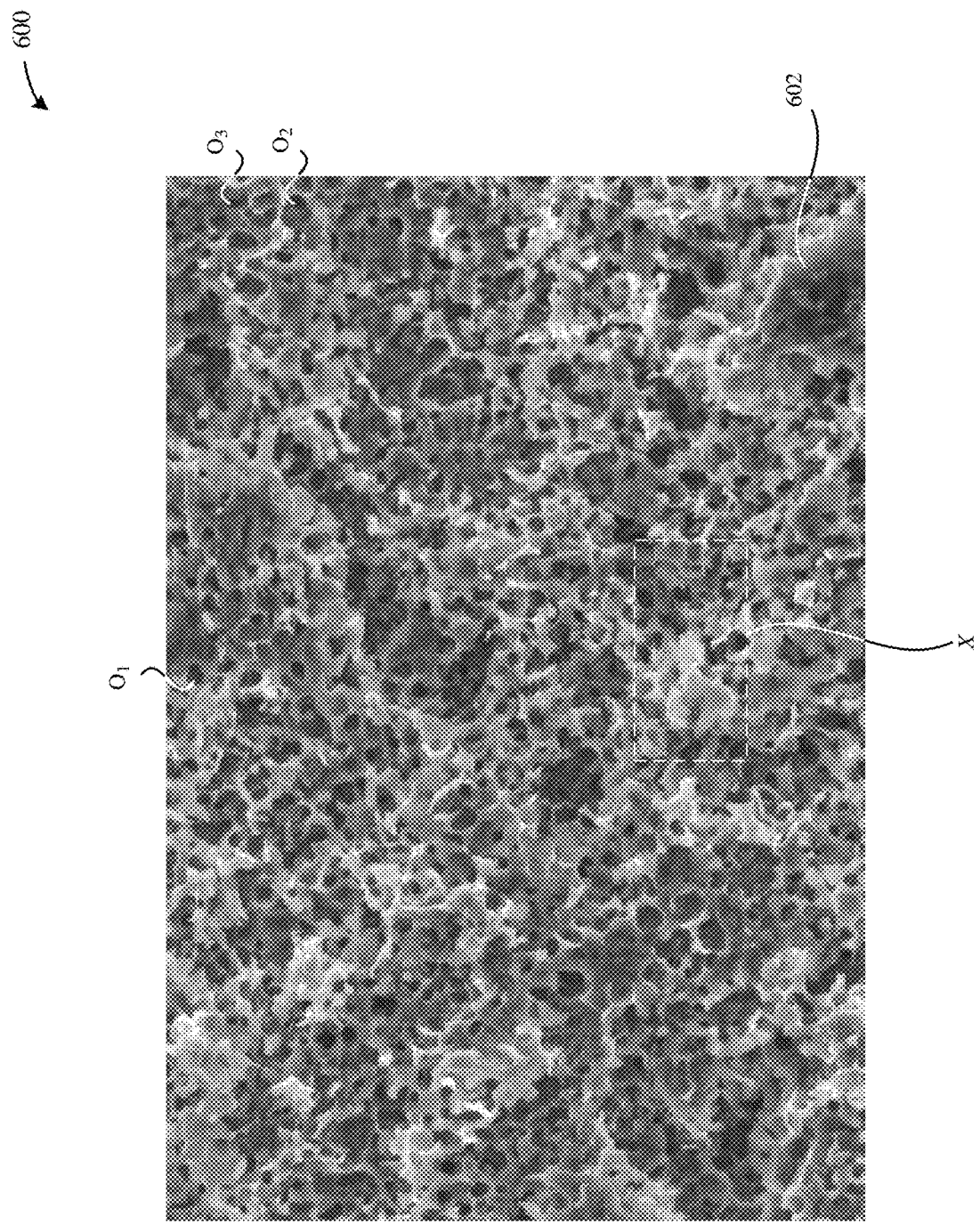
FIG. 6 illustrates an exemplary top-down image of an etched metal part, in accordance with some embodiments.

FIG. 6 illustrates an exemplary electron microscope image of an etched part, in accordance with some embodiments. In particular, FIG. 6 illustrates a top-down image of an etched part 600. According to some examples, the etched part 600 may correspond to the cleaned etched part 240. In some examples, the etched part 600 includes titanium and/or is formed from a titanium alloy. As shown in FIG. 6, randomly-distributed openings—e.g., $O_1$, $O_2$, $O_3$—are formed throughout an external surface 602 of the etched part 600. According to some examples, the openings are between about 1 micrometer to about 10 micrometers in diameter. As further illustrated in FIG. 6, the external surface 602 is textured and etched such that different portions of the external surface 602 have different heights. Beneficially, the non-uniform and textured nature of the external surface 602 may promote greater bonding between the etched part 600 and a non-metal layer—e.g., the non-metal layer 252. In some examples, the external surface 602 is characterized as having a sponge-like network of channels on a scale of several microns (e.g., less than 10 micrometers in diameter). It should be noted that the openings—e.g., $O_1$, $O_2$, $O_3$—of the external surface 602 of the etched part 600 are the result of an electrochemical etching process and not a blasting or slight roughening process.

Figure 7:
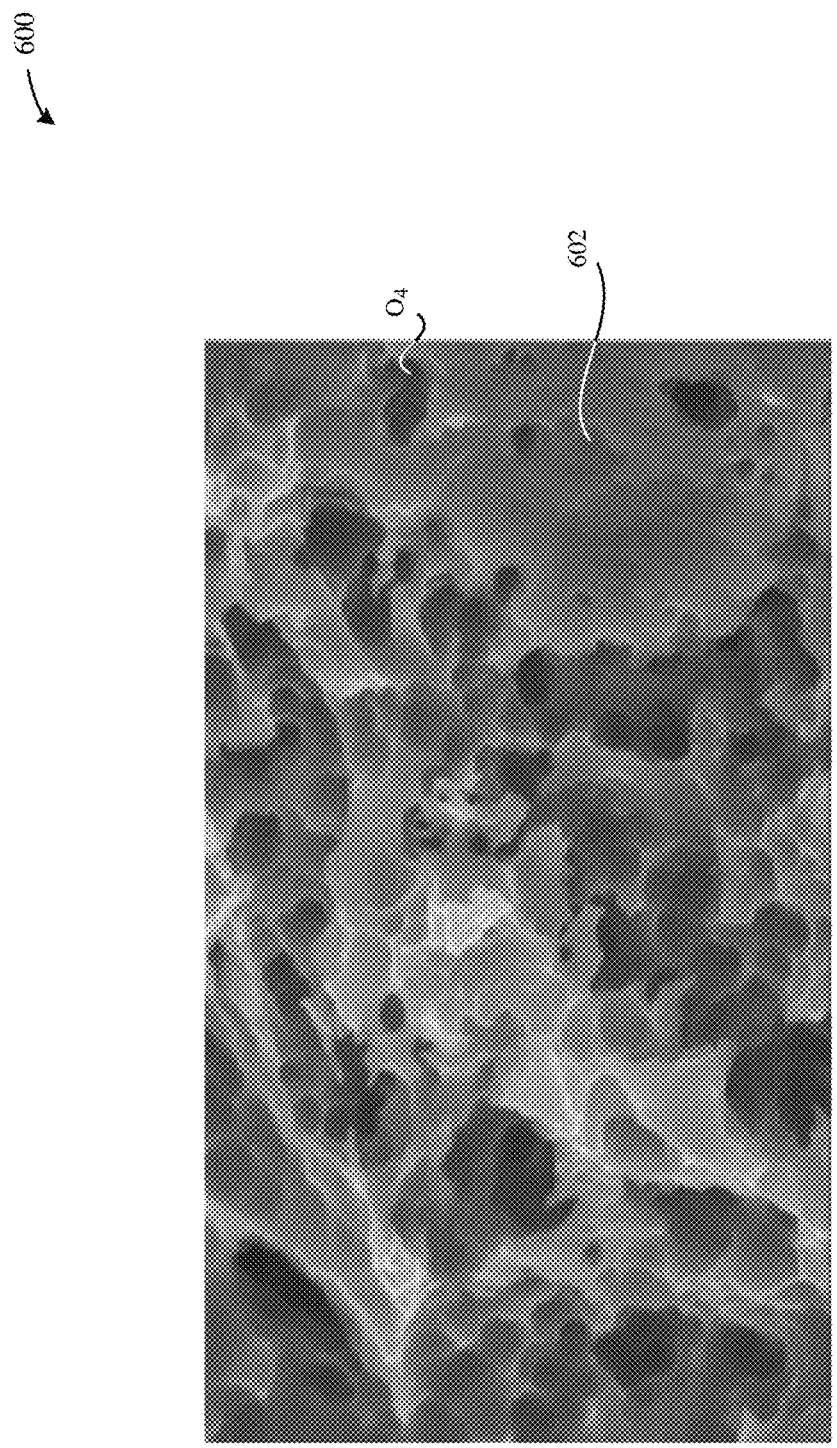
FIG. 7 illustrates an exemplary, magnified, top-down image of an etched metal part, in accordance with some embodiments.

FIG. 7 illustrates an exemplary magnified electron microscope image of the region X of the etched part 600, in accordance with some embodiments. As shown in FIG. 7, the external surface 602 of the etched part 600 exhibits fine-scale (sub-micron) roughness and porosity of channels. The result is that the external surface 602 may be characterized as having a complex, three-dimensional labyrinth of openings that are interconnected to each other. FIG. 7 further illustrates an opening $O_4$.

Figure 8:
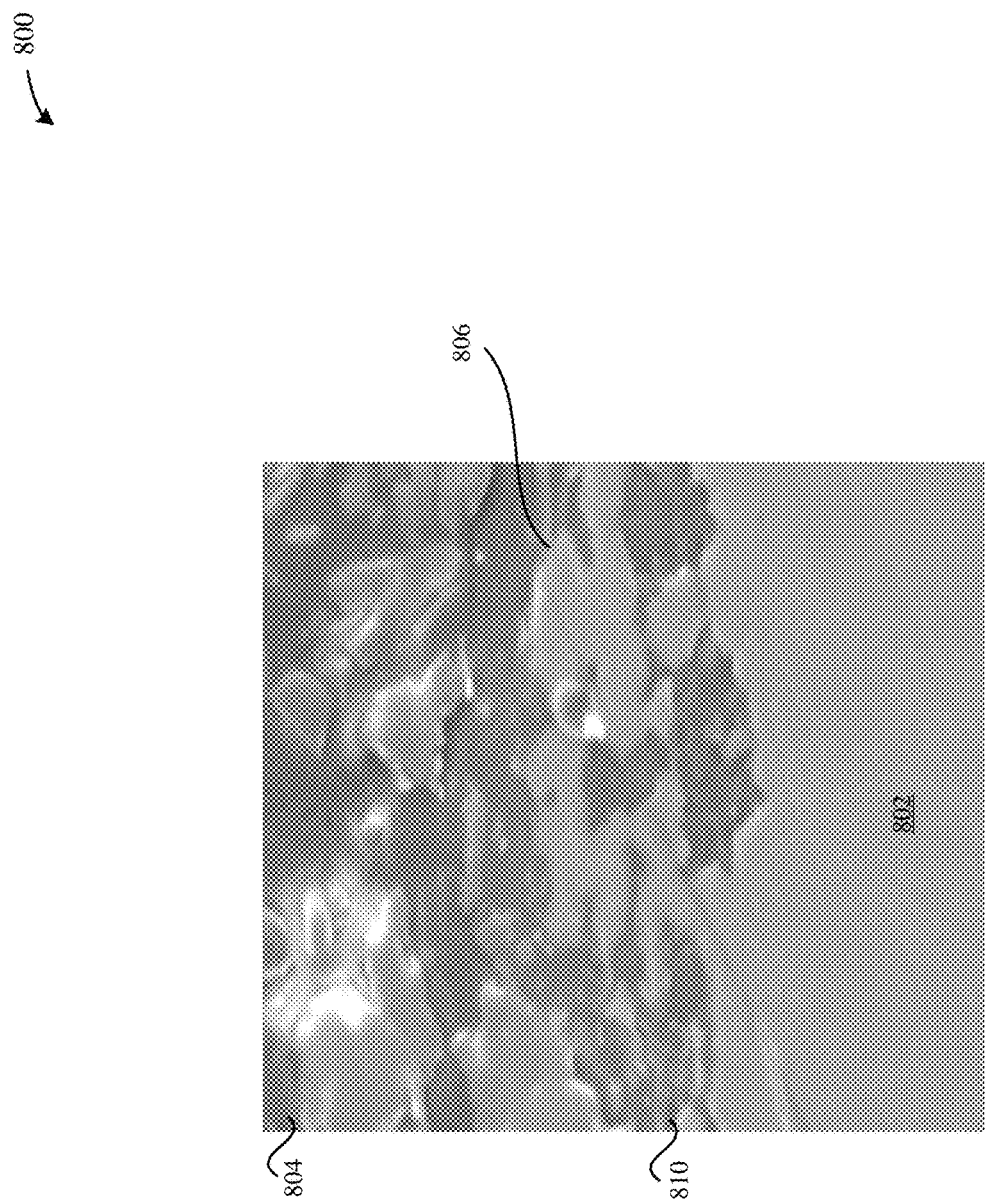
FIG. 8 illustrates an exemplary cross-sectional image of an etched metal part, in accordance with some embodiments.

FIG. 8 illustrates an exemplary cross-sectional view of an electron microscope image of a multi-layer part, in accordance with some embodiments. As shown in FIG. 8, the multi-layer part 800 includes a metal part 802 that is bonded to a non-metal part 804. In some embodiments, the metal part 802 corresponds to a part that has been exposed to an electrochemical etching process, such as the cleaned etched part 240. The metal part 802 includes openings that lead into channels. The channels are interconnected to each other. As shown in FIG. 8, the walls 806 are etched to have textured surfaces with fine scale (sub-micron) roughness. The interconnected channels of the metal part 802 is of sufficient scale for penetration by protruding features of the non-metal part 804. According to some examples, the channels may be referred to as interlocking structures due to the capability of the channels to enable interlocking between the metal part 802 and the non-metal part 804. According to some embodiments, it is preferable that the channels are capable of exerting a significant amount of attachment strength onto the protruding features of the non-metal part 804 such as to prevent the non-metal part 804 from becoming forcefully pulled away from the metal part 802.

During an injection molding process, polymer material fills in the channels of the metal part 802. As shown in FIG. 8, the non-metal part 804 includes protruding features 810 that extend through the openings of the metal part and fill in the channels. Subsequently, the penetration by the polymer material allows for mechanical interlocking between the metal part 802 and the non-metal part 804. Although etching of the external surface of the metal part 802 may reduce the hardness of the metal part 802, it should be noted that when the multi-layer part 800 is subjected to a pull strength test, that the non-metal material of the non-metal part 804 is more likely to fail first before the metal part 802 and the interface between the metal and non-metal parts 802, 804.

Any ranges cited herein are inclusive. The terms "substantially", "generally," and "about" used herein are used to describe and account for small fluctuations. For example, they can refer to less than or equal to ±5%, such as less than or equal to ±2%, such as less than or equal to ±1%, such as less than or equal to ±0.5%, such as less than or equal to ±0.1%.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A titanium alloy substrate for a portable electronic device, the titanium alloy substrate comprising:
    an exterior surface; and
    a branching channel structure that includes a first channel and a second channel, wherein:
        the first channel is defined by a first channel wall that extends away from a first opening in the exterior surface, and
        the second channel is defined by a second channel wall that extends away from a second opening in the first channel wall.

2. The titanium alloy substrate of claim 1, wherein the first and second channel walls define, in part, an internal volume.

3. The titanium alloy substrate of claim 1, wherein the branching channel structure further includes a third channel, and the third channel is defined by a third channel wall that extends from a third opening in the exterior surface.

4. The titanium alloy substrate of claim 3, wherein the third channel wall further extends from a fourth opening in the first channel wall.

5. The titanium alloy substrate of claim 1, wherein the first channel extends towards a first terminus surface, and the second channel extends towards a second terminus surface, and the first and second terminus surfaces are positioned at varied depths relative to the exterior surface.

6. The titanium alloy substrate of claim 5, wherein the varied depths of the first and second terminus surfaces are between 10 micrometers to 20 micrometers from the exterior surface.

7. The titanium alloy substrate of claim 1, wherein the titanium alloy substrate includes a two-phase titanium alloy having an α-phase and a β-phase, and the first and second channels correspond to preferential etched portions of the β-phase.

8. The titanium alloy substrate of claim 1, wherein a first portion of the titanium alloy substrate corresponding to the first channel has a first thickness, and a second portion of the titanium alloy substrate corresponding to the second channel has a second thickness different than the first thickness.

9. An enclosure for a portable electronic device, the enclosure comprising:
    a first portion including a metal substrate, the metal substrate including an interconnected network of channels, wherein the channels include:
    a first channel defined by a first channel wall, wherein the first channel wall extends from a first opening in an external surface of the metal substrate and terminates at a first terminus surface within the metal substrate, and
    a second channel defined by a second channel wall, wherein the second channel wall extends between a second opening in the external surface of the metal substrate and a third opening in the first channel wall; and
    a second portion including protruding features that extend through the first and second openings and into the first and second channels.

10. The enclosure of claim 9, wherein the first and second openings are randomly distributed throughout the external surface.

11. The enclosure of claim 9, wherein the first and second channel walls include multi-angle side surfaces that define a serpentine path.

12. The enclosure of claim 9, wherein the metal substrate is a two-phase titanium alloy having an α-phase and a β-phase, and the first and second channels correspond to preferential etched portions of the β-phase.

13. The enclosure of claim 9, wherein the first and second openings have an average diameter between 2 micrometers to 5 micrometers.

14. The enclosure of claim 9, wherein the second portion includes a polymeric material.

15. The enclosure of claim 9, wherein a first region of the metal substrate corresponding to the first channel has a first thickness, and a second region of the metal substrate corresponding to the second channel has a second thickness different than the first thickness.

16. A method for forming a part for a portable electronic device, the part including a titanium alloy substrate, the method comprising:
    exposing an exterior surface of the titanium alloy substrate to an electrochemical etching process, wherein the electrochemical etching process forms (i) an opening in the exterior surface and a first channel defined by a first channel wall that extends from the opening, and (ii) an opening in the first channel wall and a second channel defined by a second channel wall that extends from the opening in the first channel wall.

17. The method of claim 16, wherein at least a portion of the second channel is formed concurrently while forming the first channel.

18. The method of claim 17, further comprising:
    adhering a non-metal portion to the titanium alloy substrate.

19. The method of claim 18, wherein the non-metal portion includes protruding features that extend through the opening in the exterior surface and the opening in the first channel wall.

20. The method of claim 19, wherein the electrochemical etching process includes immersing the titanium alloy substrate in a chloride-based etching solution.

* * * * *